(12) United States Patent
Maruyama et al.

(10) Patent No.: US 6,341,625 B1
(45) Date of Patent: Jan. 29, 2002

(54) HYDRAULIC BRAKE HOSE ASSEMBLY FOR BICYCLES

(75) Inventors: Minoru Maruyama, Chigasaki; Hiroshi Fujisawa, Tokyo, both of (JP)

(73) Assignee: Kanagawa Toyota Motor Sales Co., Ltd., Yokohama (JP)

( * ) Notice: Subject to any disclaimer, the term of this patent is extended or adjusted under 35 U.S.C. 154(b) by 0 days.

(21) Appl. No.: 09/480,444

(22) Filed: Jan. 10, 2000

(51) Int. Cl.[7] .............................................. F16L 11/10
(52) U.S. Cl. .................... 138/109; 138/127; 138/125; 138/126; 138/146; 138/DIG. 3
(58) Field of Search ................. 138/109, 125, 138/126, 127, 146, DIG. 3

(56) References Cited

U.S. PATENT DOCUMENTS

| | | |
|---|---|---|
| 39,238 A | 7/1863 | Mayall |
| 1,036,428 A | 8/1912 | Bissell |
| 2,476,480 A | 9/1949 | Burckle et al. |
| 2,540,113 A | 2/1951 | Hartley et al. |
| 2,764,430 A | 9/1956 | Roberts |
| 3,520,562 A | 7/1970 | Moos |
| 3,977,440 A * | 8/1976 | Phillippi ................. 138/130 |
| 4,106,526 A * | 8/1978 | Szentmihaly .............. 138/109 |
| 4,111,237 A | 9/1978 | Mutzner et al. |
| 4,283,448 A * | 8/1981 | Bowman ............... 138/DIG. 3 |
| 4,366,746 A * | 1/1983 | Rosecrans ................. 138/125 |
| 4,391,353 A | 7/1983 | Mathauser |
| 4,615,415 A | 10/1986 | Mathauser |
| 4,617,213 A | 10/1986 | Asano et al. |
| 4,632,225 A | 12/1986 | Mathauser |
| 4,813,517 A | 3/1989 | Mann |
| 5,143,122 A * | 9/1992 | Adkins .................... 138/109 |
| 5,178,423 A | 1/1993 | Combeau |
| 5,460,247 A * | 10/1995 | Fouts ................... 138/DIG. 3 |
| 5,483,412 A * | 1/1996 | Albino et al. ............. 138/125 |
| 5,622,210 A * | 4/1997 | Crisman et al. ............ 138/127 |
| 5,678,665 A | 10/1997 | Debreczeni |
| 5,853,202 A | 12/1998 | Li et al. |
| 5,931,200 A * | 8/1999 | Mulvey et al. ............. 138/109 |

FOREIGN PATENT DOCUMENTS

GB 745061 2/1956

OTHER PUBLICATIONS

Bicycle Club Magazine excerpt from Aug. 1999 issue.
Earl's Performance Products Catalogue, 1986.

* cited by examiner

Primary Examiner—James Hook
(74) Attorney, Agent, or Firm—Pennie & Edmonds LLP

(57) ABSTRACT

A hydraulic brake hose assembly for bicycles. A tube for carrying fluid is covered by a fiber mesh layer. The covered tube has a first fitting at a first end of the covered tube, a second fitting at a second end of the covered tube and a coating over the covered tube from the first end to the second end, covering a first point where the first fitting meets the covered tube and covering a second point where the second fitting meets the covered tube. The fluid carrying tube may be formed of polytetrafluoroethylene (PTFE) fiber material, such as TEFLON®, polypropylene, polyvinyl chloride, rubber or any other suitable material. The fiber mesh layer may be formed of a metallic material, such as steel, stainless steel, aluminum, titanium, or any other suitable non-metallic material, such as carbon fiber, polyamide fiber, such as KEVLAR®, glass fiber, and graphite fiber. The coating may be formed of shrink-fit polyolefin, or any other suitable material. The first and second fittings may be configured and adapted to facilitate removal of the brake hose assembly from a brake system and re-attachment of the brake hose assembly to the brake system, permitting the assembly to be reused. The first and second fittings may also be configured and adapted for removal from the covered tube and replacement on the covered tube.

45 Claims, 3 Drawing Sheets

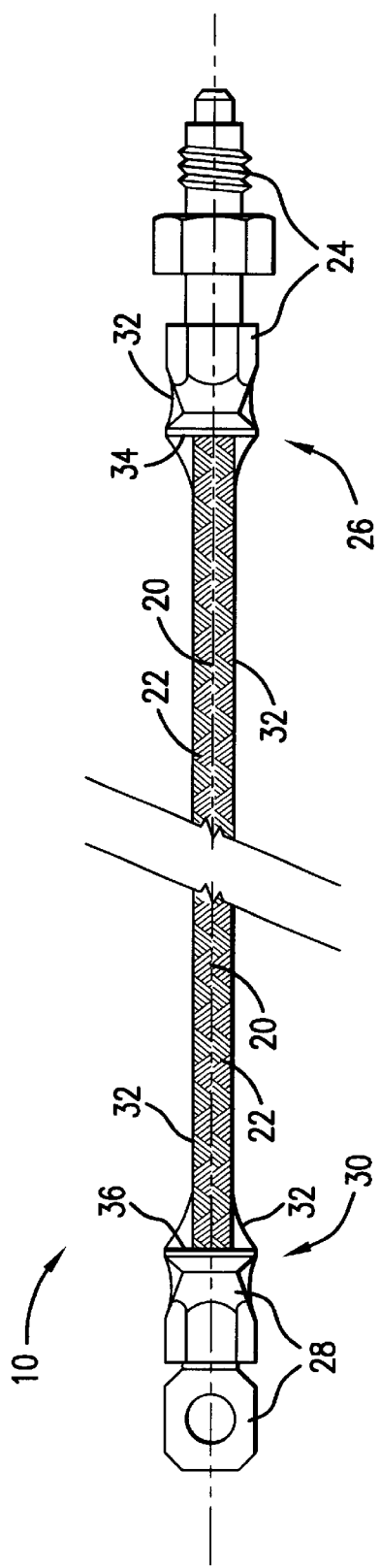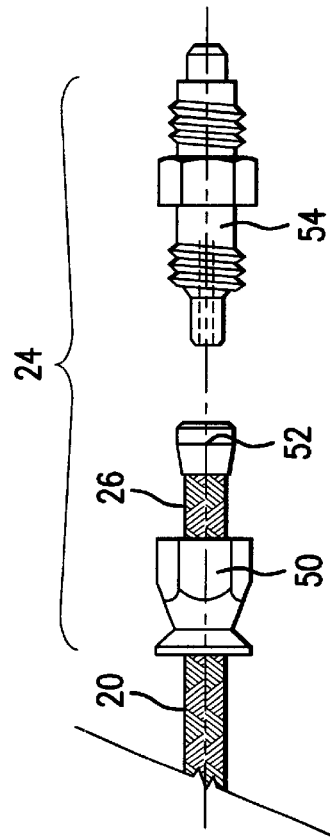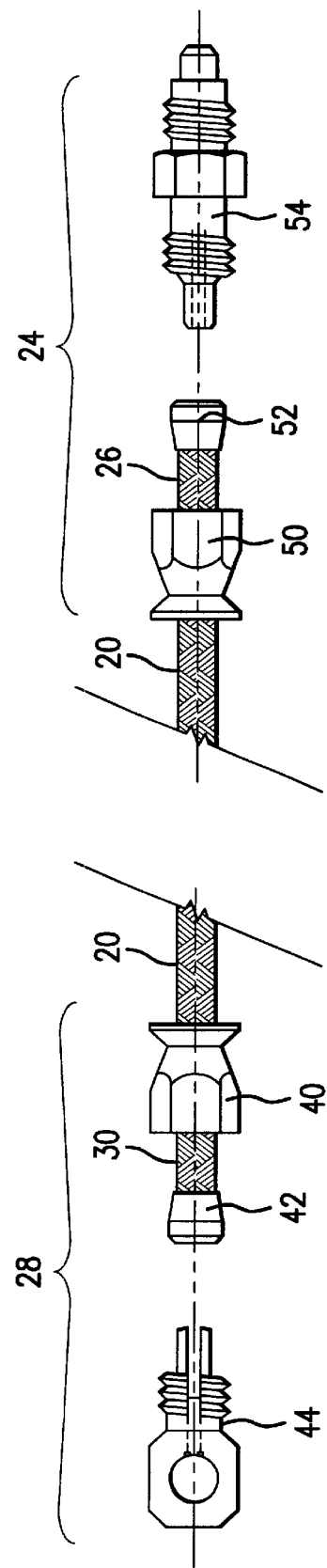

HYDRAULIC BRAKE HOSE ASSEMBLY FOR BICYCLES

FIELD OF THE INVENTION

The present invention relates generally to the field of hydraulic braking systems, and more particularly to an improved hydraulic brake hose assembly for bicycles.

BACKGROUND OF THE INVENTION

In recent years, mountain bicycles have become increasingly popular with bicycle enthusiasts throughout the world. These bicycles are ruggedly designed and provide for maximum speed and performance on "off-road" terrain. Mountain bike racing, both amateur and professional, has also grown in popularity, see, e.g., <http://www.mountainbike.com>. However, the bicycle industry has been hard-pressed to provide high performance components that satisfy a mountain biker's stringent speed and durability requirements.

As might be expected, efficient and reliable braking systems are particularly important for mountain bikes. Such braking systems must withstand the friction and heat associated with high speed racing, and the frequent impacts, falls and sloppy riding conditions associated with rugged mountain bike terrain. Hydraulic braking systems for conventional bicycles have been known and used in the past, as shown in U.S. Pat. Nos. 4,391,353 and 4,615,415 to Mathauser, U.S. Pat. No. 5,678,665 to Debreczeni and U.K. Patent 745,061 to DuBois et al. Most prior art hydraulic braking systems for bicycles utilize a plastic brake hose 2 with crimp-type end fittings 4 that are crushed onto or "crimped" to the brake hose, as shown in FIG. 1. These hose assemblies are limited in several respects. First, the end fittings are not reusable; that is, they cannot be reattached once they are removed. Thus, if a biker needs to remove a brake line in order to bleed, flush or clean the brake system, he or she will have to replace the entire brake hose assembly. Second, presently known brake hose assemblies, which are typically made of relatively weak plastic materials, lack durability, and are, therefore, prone to cracks, nicks, or cuts from the impacts and falls common to mountain biking. These brake hose systems must frequently be replaced, and will often force a racer to withdraw during a race because of mechanical failure. Damaged brake hoses may also allow contaminants, like dirt, sand, mud and water, to enter the brake system and compromise performance. Finally, presently known plastic brake hoses often suffer from diametric expansion due to the heat generated from braking friction (especially harsh under racing conditions), the sun, or outdoor air temperature. The expansion is often referred to as a "spongy" brake feeling, which translates to diminished braking performance. As the rider presses on the brake handle or actuator in an attempt to increase the fluid pressure throughout the system, the brake hose will often expand or bubble, increasing the system volume, and, thus, limiting the pressure within the hose, resulting in decreased braking performance.

Therefore, a need exists for an improved hydraulic brake hose assembly that will offer reusability, increased durability, and more consistent braking performance to mountain bike racers. The present invention provides such a brake hose.

SUMMARY OF THE INVENTION

The invention is directed to a hydraulic brake hose assembly comprising a tube for carrying fluid, a fiber mesh layer covering the tube, thereby reinforcing and protecting the tube; a first fitting at a first end of the covered tube; a second fitting at a second end of the covered tube; and a coating over the covered tube from the first end to the second end, covering a first point where the first fitting meets the covered tube, and covering a second point where the second fitting meets the covered tube. The coating further protects the covered tube and fittings, and prevents contaminants from entering the tube. The tube may be formed of expanded polytetrafluoroethylene (PTFE), polypropylene, polyvinyl chloride (PVC), polyethylene, rubber or any other suitable material. Preferably, the tube is formed of an expanded polytetrafluoroethylene (PTFE) material, such as TEFLON®. The fiber mesh layer may be formed of a metallic material, such as steel, stainless steel, aluminum, or titanium, or, it may be formed of a suitable non-metallic material, such as carbon fiber, polyamide fiber, such as KEVLAR®, glass fiber (fiberglass), or graphite fiber. The coating may be formed of a polyolefin material, such as polyethylene, or it may be formed of other suitable materials such as polyvinyl chloride (PVC), polytetrafluoroethylene (PTFE), or polyurethane. Preferably, the fiber mesh layer is formed of stainless steel and the coating is formed of a shrink-fit polyolefin material. The coating may be transparent or colored to match the surrounding components. While the shrink fit method is preferred, several other coating methods, such as dipping the covered tube or spraying the covered tube, are also applicable.

In a preferred embodiment, the brake hose assembly is reusable, and the first and second fittings are configured and adapted to facilitate removal of the brake hose assembly from a brake system and re-attachment of the brake hose assembly to the brake system. In addition, the first and second fittings may be configured and adapted for removal from the covered tube and replacement on the covered tube. The first fitting may comprise: a cap threaded to accept a screw-type adaptor; an olive; and an adaptor for a master cylinder wherein the cap, olive and adaptor are connected to the covered tube to form a fluid-tight connection between the covered tube and the master cylinder. The second fitting may further comprise a cap threaded to accept a screw-type adaptor; an olive; and an adaptor for a brake caliper wherein the cap, olive and adaptor are connected to the covered tube to form a fluid-tight connection between the covered tube and the brake caliper.

Alternatively, the first and second fittings may be swaged to the covered tube.

In another preferred embodiment of the invention, the brake hose assembly comprises: a flexible tube for carrying fluid; a flexible fiber mesh layer covering the tube, thereby forming a reinforced hose; a first fitting at a first end of the reinforced hose; a second fitting at a second end of the reinforced hose; and a coating over the reinforced hose from the first end to the second end, covering a first point where the first fitting meets the reinforced hose and covering a second point where the second fitting meets the reinforced hose, wherein the coating further protects the reinforced hose and fittings. As in the previous embodiment, the flexible tube may be formed of expanded polytetrafluoroethylene (PTFE), polypropylene, polyvinyl chloride (PVC), polyethylene or rubber. Preferably, the flexible tube is formed of an expanded polytetrafluoroethylene (PTFE), such as TEFLON(®. The fiber mesh layer may be formed of a metallic material, such as steel, stainless steel, aluminum, or titanium, or, it may be formed of a suitable non-metallic material, such as carbon fiber, polyamide fiber, such as KEVLAR®, glass fiber (fiberglass), or graphite fiber. The coating may be formed of a polyolefin material, such as polyethylene, or it may be formed of other suitable materials such as polyvinyl chloride (PVC), polytetrafluoroethylene (PTFE), or polyurethane. Preferably, the fiber mesh layer is formed of stainless steel and the coating is formed of a shrink-fit polyolefin material. The coating may be transparent or colored to match the surrounding components.

In one specific example of this embodiment, the brake hose assembly is reusable, and the first and second fittings are configured and adapted to facilitate removal of the brake hose assembly from a brake system and re-attachment of the brake hose assembly to the brake system. In addition, the first and second fittings may be configured and adapted for removal from the reinforced hose and replacement on the reinforced hose. The first fitting may comprise: a cap threaded to accept a screw-type adaptor; an olive; and an adaptor for a master cylinder, wherein the first end of the reinforced hose is threaded through the cap, the olive is positioned over the first end of the reinforced hose, thereby preventing removal of the cap from the hose without removal of the olive, and the adaptor comprises threads for connection to the cap, and interfaces with the olive to form a fluid-tight connection between the hose and the master cylinder. The second fitting may comprise: a cap threaded to accept a screw-type adaptor; an olive; and an adaptor for a brake caliper, wherein the second end of the reinforced hose is threaded through the cap, the olive is positioned over the second end of the reinforced hose, thereby preventing removal of the cap from the hose without removal of the olive, and the adaptor comprises threads for connection to the cap and interfaces with the olive to form a fluid-tight connection between the hose and the brake caliper.

Alternatively, the first and second fittings can be swaged to the reinforced hose.

In a further embodiment, the invention is a reusable hydraulic brake hose assembly comprising: a flexible tube for carrying fluid; a flexible fiber mesh layer covering the tube, thereby forming a reinforced hose; a first fitting at a first end of the reinforced hose; a second fitting at a second end of the reinforced hose; wherein the first and second fittings are configured and adapted to facilitate removal of the brake hose assembly from a brake system and re-attachment of the brake hose assembly to the brake system. Again, the flexible inner tube may be formed of expanded polytetrafluoroethylene (PTFE), polypropylene, polyvinyl chloride (PVC), polyethylene or rubber. Preferably, the flexible tube is formed of an expanded polytetrafluoroethylene (PTFE), such as TEFLON®. The fiber mesh layer may be formed of a metallic material, such as steel, stainless steel, aluminum, or titanium, or, it may be formed of a suitable non-metallic material, such as carbon fiber, polyamide fiber, such as KEVLAR®, glass fiber (fiberglass), or graphite fiber. The mesh fiber layer is preferably formed of stainless steel.

In one specific example of this embodiment, the first and second fittings are adapted and configured for removal from the reinforced hose and replacement on the reinforced hose. The first fitting may comprise: a cap threaded to accept a screw-type adaptor, an olive, and an adaptor for a master cylinder, where the first end of the reinforced hose is threaded through the cap, the olive is positioned over the first end of the reinforced hose, thereby preventing removal of the cap from the hose without removal of the olive, and the adaptor comprises threads for connection to the cap and interfaces with the olive to form a fluid-tight connection between the hose and the master cylinder. The second fitting comprises: a cap threaded to accept a screw-type adaptor, an olive, and an adaptor for a brake caliper, where the second end of the reinforced hose is threaded through the cap, the olive is positioned over the second end of the reinforced hose, thereby preventing removal of the cap from the hose without removal of the olive, and the adaptor comprises threads for connection to the cap, and interfaces with the olive to form a fluid-tight connection between the hose and the brake caliper.

The assembly may further comprise a coating over the reinforced hose from the first end to the second end, covering a first point where the first fitting meets the reinforced hose and covering a second point where the second fitting meets the reinforced hose, where the coating further protects the reinforced hose and fittings. Once again, the coating may be formed of a polyolefin material, such as polyethylene, or it may be formed of other suitable materials such as polyvinyl chloride (PVC), polytetrafluoroethylene (PTFE), or polyurethane. Preferably, the coating is formed of a shrink-fit polyolefin material. The coating may be transparent or colored to match the surrounding components.

BRIEF DESCRIPTION OF THE DRAWINGS

The present invention will be understood and appreciated more fully from the following detailed description, taken in conjunction with the drawings in which:

FIG. 2 is a schematic diagram of a preferred embodiment of the hydraulic brake hose assembly of the present invention.

FIG. 3 is a partial schematic diagram illustrating an exploded view of the removable fitting assembly at one end of the embodiment shown in FIG. 2.

FIG. 4 is a partial schematic diagram illustrating an exploded view of the removable fitting assembly of another end of the embodiment shown in FIG. 2.

DETAILED DESCRIPTION OF THE PREFERRED EMBODIMENTS

Figure 1:
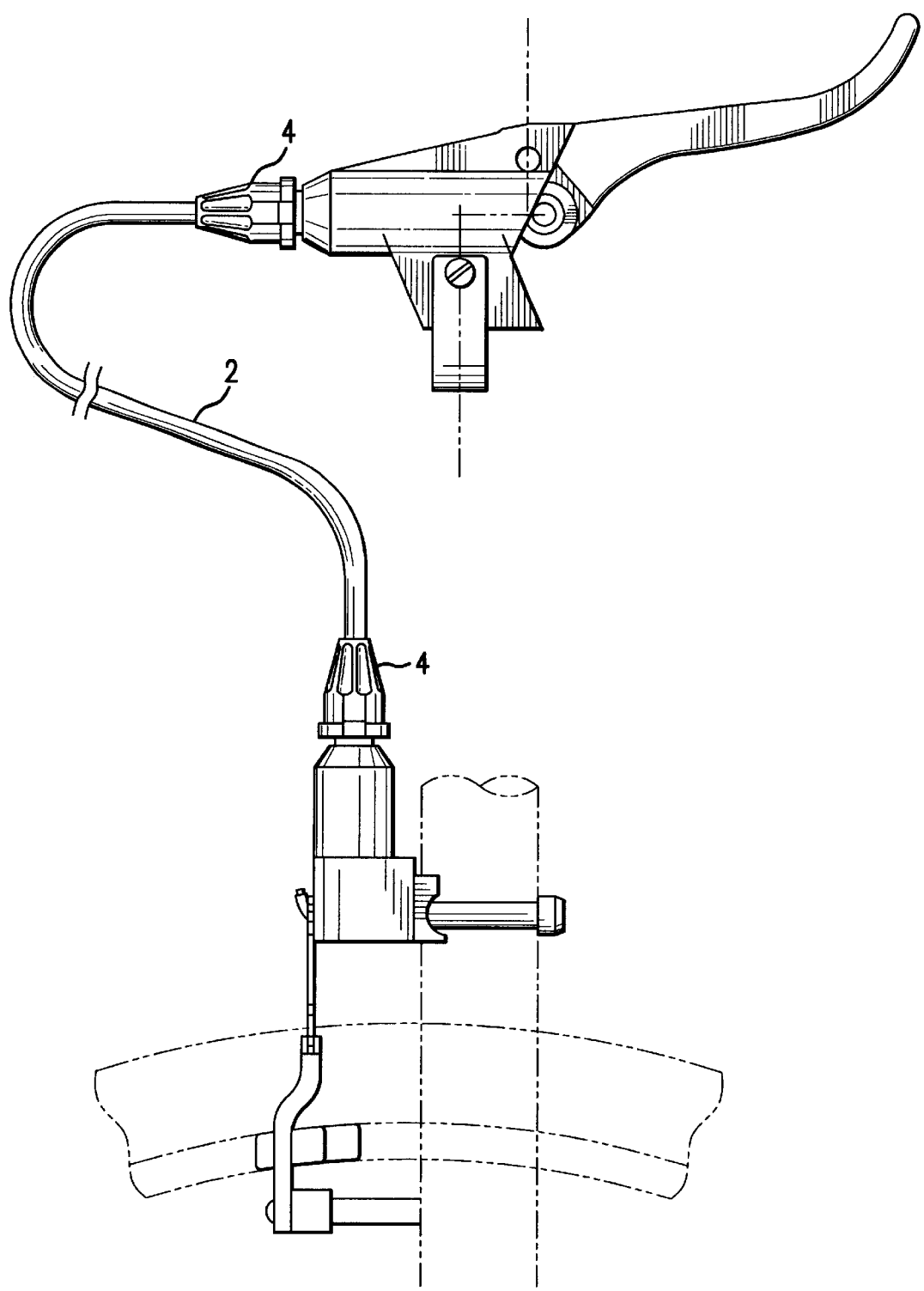
FIG. 1 illustrates a hydraulic brake hose of the prior art.

Reference is now made to FIG. 2, which is a schematic diagram illustrating a preferred embodiment of the hydraulic brake hose assembly 10 of the present invention. The assembly 10 comprises a reinforced hose 20, formed of a flexible tube (not shown) for carrying fluid and a flexible fiber mesh layer 22 covering the tube. The flexible tube is preferably made of polytetrafluorethylene (PTFE), such as TEFLON® fiber material manufactured by E. I. du Pont de Nemours and Company, but may be made of any other suitable material, such as polypropylene, polyvinyl chloride (PVC), polyethylene or rubber. The fiber mesh layer 22 is preferably made of stainless steel, but may be made of other suitable materials with similar strength and durability characteristics such as steel, aluminum, titanium, carbon fiber, polyamide fiber, such as KEVLAR® fiber (also manufactured by E. I. du Pont de Nemours and Company), glass fiber (i.e., fiberglass), or graphite fiber. Reinforced hose 20 has a first fitting 24 at a first end 26 for connection to a hydraulic brake system master cylinder, and a second fitting 28, at a second end 30 of reinforced hose 20, for connection to a brake caliper, which may be adapted for disk brakes or any other known braking system. Fittings 24 and 28 are preferably made of stainless steel, but could be made of other suitable materials (e.g., aluminum, steel, titanium, carbon fiber, etc.). Reinforced hose 20 is enveloped by coating 32. Coating 32 further protects hose 20 against cracks, nicks, or cuts caused by falls or impacts by trees, sticks, rocks, etc.; and coating 32 protects the hose 20 from wear and tear, and/or contamination of the brake line caused by the elements (e.g., dirt, sand, mud, water) encountered during mountain biking. Coating 32 also protects the paint and finish on the bicycle frame from scratches due to chafing from the fiber mesh layer of hose 20. Coating 32, which is preferably a heat-shrink, polyolefin material, covers hose 20 from first end 26 to second end 30. Coating 32 may also be formed of polyethylene, polytetrafluoroethylene (PTFE), polyurethane or any other suitable material. In, addition to the preferred heat shrink-fit method, coating 32 may be applied to the covered hose by dipping, spraying or wrapping. Preferably, coating 32 also covers the base of fittings 24 and 28 and the transition points 34 and 36 where fittings 24 and 28 meet reinforced hose 20. Thus, coating 32 serves several functions: (1) it adds further protection to the hose 20 and fittings 24 and 28, (2) it prevents hose 20 from scratching or damaging the finish on the bicycle frame, and (3) it prevents contaminants like dirt, sand, mud and water from entering the brake system at the transition points 34 and 36. In this embodiment, the entire brake hose assembly 10 is reusable, and the end fittings 24 and 28 are specifically configured so that the entire assembly can be easily removed from a brake system during a cleaning or maintenance procedure, and, later, be easily re-attached to the brake system. In addition, end fittings 24 and 28 are themselves reusable, that is, they may be removed from hose 20 and replaced on hose 20 after a maintenance procedure. This feature will be more fully described in reference to FIGS. 3 and 4 below.

Reference is now made to FIG. 3, which is a partial schematic diagram illustrating an exploded view of the removable fitting assembly of one end of the embodiment shown in FIG. 2. As mentioned above, fitting 28 is assembled at end 30 of reinforced hose 20. Fitting 28 is provided to connect hose 20 to a brake caliper (not shown). Fitting 28 has multiple components: a cap 40, an olive 42, and an adaptor for a brake caliper 44. Olive 42 may be replaced by a similar component, such as an o-ring or a washer. Fitting 28 is assembled by threading end 30 of hose 20 through cap 40 and placing olive 42 over end 30 such that cap 40 cannot be removed from hose 20 without removing olive 42 from hose 20. Olive 42 can be placed on hose 20 by using simple hand tools, or, for those with particular mechanical skill, with no tools at all. Once olive 42 is in place, adaptor 44 is screwed into cap 40, which is threaded to accept a screw type adaptor, and adaptor 44 interfaces with olive 42 to form a fluid-tight connection between hose 20 and the brake caliper. This type of fitting allows the brake hose to be removed for maintenance or cleaning, and re-installed, without replacing the fittings or the hose. In addition, if necessary, the hose can be shortened and the same fittings can be replaced on the shortened hose (only the olive 42 would have to be replaced).

Reference is now made to FIG. 4, which is a partial schematic diagram illustrating an exploded view of the removable fitting assembly of the other end of the embodiment shown in FIG. 2. As described briefly above, fitting 24 is assembled at end 26 of reinforced hose 20. Fitting 24 is provided to connect hose 20 to a master cylinder (not shown). Fitting 24 has multiple components: a cap 50, an olive 52, and an adaptor for a master cylinder 54. Again, if desired, olive 52 may be replaced by a similar component, such as an o-ring or a washer. Fitting 24 is assembled by threading end 26 of hose 20 through cap 50 and placing olive 52 over end 26 such that cap 50 cannot be removed from hose 20 without removing olive 52 from hose 20. Olive 52 can be placed on hose 20 by using simple hand tools, or, for those with particular mechanical skill, with no tools at all. Once olive 52 is in place, adaptor 54 is screwed into cap 50, which is threaded to accept a screw-type adaptor, and adaptor 54 interfaces with olive 52 to form a fluid-tight connection between hose 20 and the brake system master cylinder. The plastic coating 32, as shown in FIG. 2, would be placed over the hose after assembly of the end fittings 24 and 28. As with fitting 28 above, fitting 24 allows the brake hose to be removed during maintenance or cleaning, and re-installed, without replacing the fittings or the hose. If necessary, the hose can be shortened and the same fittings can be replaced on the shortened hose (only olive 52 would have to be replaced).

Figure 5:
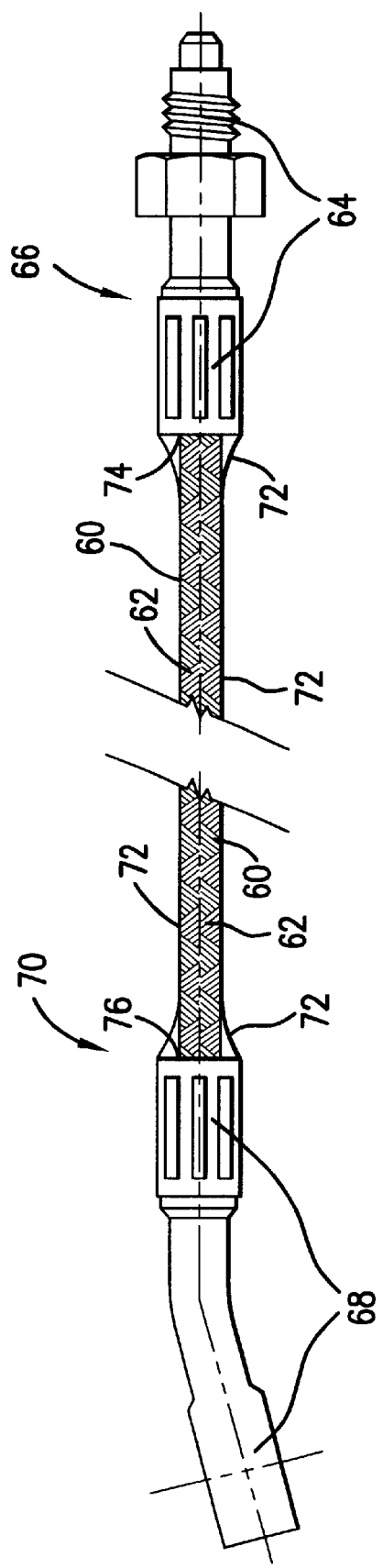
FIG. 5 is a schematic diagram of an alternate preferred embodiment of the hydraulic brake hose assembly of the present invention.

Reference is now made to FIG. 5, which is a schematic diagram illustrating an alternate embodiment of the hydraulic brake hose assembly of the present invention. The assembly comprises a reinforced hose 60, formed of a flexible tube for carrying fluid and a flexible fiber mesh layer 62 covering the tube. Again, the flexible tube is preferably made of polytetrafluoroethylene (PTFE), such as TEFLON® fiber material manufactured by E. I. du Pont de Nemours and Company, but may be made of any other suitable material, such as polypropylene, polyvinyl chloride (PVC), polyethylene or rubber. The fiber mesh layer 62 is preferably made of stainless steel, but may be made of other suitable materials with similar strength and durability characteristics such as steel, aluminum, titanium, carbon fiber, polyamide fiber, such as KEVLAR® fiber (also manufactured by E. I. du Pont de Nemours and Company), glass fiber (i.e., fiberglass), or graphite fiber. Reinforced hose 60 has a first fitting 64 at a first end 66 for connection to a hydraulic brake system master cylinder. A second fitting 68, at a second end 70 of reinforced hose 60, provides for connection to a brake caliper. The caliper may be adapted for disk brakes or any other known braking system. As shown in FIG. 5, the shape, configuration, or curvature of fitting 68, and fitting 64, may be modified to adapt to the particular brake system application. Fittings 64 and 68 are preferably made of stainless steel, but could be made of other suitable materials (e.g., aluminum, steel, titanium, carbon fiber, etc.). In this embodiment, fittings 64 and 68 are swaged to ends 66 and 70 of reinforced hose 60. Coating 72 further protects hose 60 against cracks, nicks, or cuts caused by falls or impacts by trees, sticks, rocks, etc.; and coating 72 protects hose 60 from wear and tear, and contamination of the brake line caused by the elements (e.g., dirt, sand, mud, water) encountered during mountain biking. Coating 72 also protects the paint and finish on surfaces that contact the hose, such as the bicycle frame, from scratches due to chafing from the fiber mesh layer of hose 60. Coating 72, which is preferably a heat-shrink, polyolefin material, covers hose 60 from first end 66 to second end 70. Coating 72 may also be formed of polyethylene, polytetrafluoroethylene (PTFE), polyurethane or any other suitable material. In, addition to the preferred heat shrink-fit method, coating 72 may be applied to the covered hose by dipping, spraying or wrapping. Preferably, coating 72 also covers the base of fittings 64 and 68 and the transition points 74 and 76 where fittings 64 and 68 meet reinforced hose 60. Thus, as in the previous embodiment, coating 72 serves several functions: 1) it adds further protection to the hose 60 and fittings 64 and 68, (2) it prevents hose 60 from scratching or damaging the finish on the bicycle frame or other associated surfaces, and (3) it prevents contaminants like dirt, sand, mud and water from entering the brake system at the transition points 74 and 76.

While the present invention has been described with reference to the preferred embodiments, those skilled in the art will recognize that numerous variations and modifications may be made without departing from the scope of the present invention. This is especially true with regard to the shape and configuration of the fittings, which may be easily modified to fit different brake system applications. Accordingly, it should be clearly understood that the embodiments of the invention described above are not intended as limitations on the scope of the invention, which is defined only by the following claims.

What is claimed is:

1. A durable, hydraulic brake hose assembly for installation on the exterior of a bicycle frame comprising:

a tube for carrying fluid;

a fiber mesh layer covering the tube, thereby forming a covered tube;

a first fitting at a first end of the covered tube;

a second fitting at a second end of the covered tube; and a coating over the covered tube from the first end to the second end, covering a first point where the first fitting meets the covered tube and covering a second point where the second fitting meets the covered tube wherein the fiber mesh layer and coating protect the tube from structural damage and contamination caused by the natural elements during bicycling.

2. The brake hose assembly of claim 1, wherein the tube is formed of a material selected from the group consisting of expanded polytetrafluoroethylene (PTFE), polypropylene, polyvinyl chloride (PVC), polyethylene and rubber.

3. The brake hose assembly of claim 1, wherein the tube is formed of expanded polytetrafluoroethylene (PTFE).

4. The brake hose assembly of claim 1, wherein the fiber mesh layer is formed of a metallic material.

5. The brake hose assembly of claim 4, wherein the metallic material is selected from the group consisting of steel, stainless steel, aluminum, and titanium.

6. The brake hose assembly of claim 4, wherein the metallic material is stainless steel.

7. The brake hose assembly of claim 1, wherein the fiber mesh layer is formed of a material selected from the group consisting of carbon fiber, polyamide fiber, glass fiber, and graphite fiber.

8. The brake hose assembly of claim 1, wherein the first and second fittings are swaged to the covered tube.

9. The brake hose assembly of claim 1, wherein the brake hose assembly is reusable.

10. The brake hose assembly of claim 9, wherein the first and second fittings are configured and adapted to facilitate removal of the brake hose assembly from a bicycle brake system and re-attachment of the brake hose assembly to the bicycle brake system.

11. The brake hose assembly of claim 10, wherein the first and second fittings are configured and adapted for removal from the covered tube and replacement on the covered tube.

12. The brake hose assembly of claim 11, wherein the first fitting comprises:

a cap threaded to accept a screw-type adaptor;

an olive; and an adaptor for a master cylinder wherein the cap, olive and adaptor are connected to the covered tube to form a fluid-tight connection between the covered tube and the master cylinder.

13. The brake hose assembly of claim 11, wherein the second fitting comprises:

a cap threaded to accept a screw-type adaptor;

an olive; and an adaptor for a brake caliper wherein the cap, olive and adaptor are connected to the covered tube to form a fluid-tight connection between the covered tube and the brake caliper.

14. The brake hose assembly of claim 1, wherein the coating is formed of a polyolefin material.

15. The brake hose assembly of claim 1 wherein the coating is formed of a material selected from the group consisting of polyvinyl chloride (PVC), polyethylene, expanded polytetrafluoroethylene (PTFE) and polyurethane.

16. The brake hose assembly of claim 1, wherein the coating is formed of a shrink-fit polyolefin material.

17. A durable, hydraulic brake hose assembly for installation on the exterior of a bicycle frame comprising:

a flexible tube for carrying fluid; a flexible fiber mesh layer covering the tube, thereby forming a reinforced hose;

a first fitting at a first end of the reinforced hose;

a second fitting at a second end of the reinforced hose; and a coating over the reinforced hose from the first end to the second end, covering a first point where the first fitting meets the reinforced hose and covering a second point where the second fitting meets the reinforced hose wherein the fiber mesh layer and coating protect the tube from structural damage and contamination caused by the natural elements during bicycling.

18. The brake hose assembly of claim 17, wherein the flexible tube is formed of a material selected from the group consisting of expanded polytetrafluoroethylene (PTFE), polypropylene, polyvinyl chloride (PVC), polyethylene and rubber.

19. The brake hose assembly of claim 17, wherein the flexible tube is formed of expanded polytetrafluoroethylene (PTFE).

20. The brake hose assembly of claim 17, wherein the fiber mesh layer is formed of a metallic material.

21. The brake hose assembly of claim 20 wherein the metallic material is selected from the group consisting of steel, stainless steel, aluminum, and titanium.

22. The brake hose assembly of claim 20, wherein the metallic material is stainless steel.

23. The brake hose assembly of claim 17 wherein the fiber mesh layer is formed of a material selected from the group consisting of carbon fiber, polyamide fiber, glass fiber, and graphite fiber.

24. The brake hose assembly of claim 17, wherein the first and second fittings are swaged to the reinforced hose.

25. The brake hose assembly of claim 17, wherein the brake hose assembly is reusable.

26. The brake hose assembly of claim 25, wherein the first and second fittings are configured and adapted to facilitate removal of the brake hose assembly from a bicycle brake system and re-attachment of the brake hose assembly to the bicycle brake system.

27. The brake hose assembly of claim 26, wherein the first and second fittings are configured and adapted for removal from the reinforced hose and replacement on the reinforced hose.

28. The brake hose assembly of claim 27, wherein the first fitting comprises:

a cap threaded to accept a screw-type adaptor;

an olive; and an adaptor for a master cylinder wherein the first end of the reinforced hose is threaded through the cap, the olive is positioned over the first end of the reinforced hose, thereby preventing removal of the cap from the hose without removal of the olive, and the adaptor comprises threads for connection to the cap, and interfaces with the olive to form a fluid-tight connection between the hose and the master cylinder.

29. The brake hose assembly of claim 27 wherein the second fitting comprises:

a cap threaded to accept a screw-type adaptor;

an olive; and an adaptor for a brake caliper wherein the second end of the reinforced hose is threaded through the cap, the olive is positioned over the second end of the reinforced hose, thereby preventing removal of the cap from the hose without removal of the olive, and the adaptor comprises threads for connection to the cap and interfaces with the olive to form a fluid-tight connection between the hose and the brake caliper.

30. The brake hose assembly of claim 17, wherein the coating is formed of a polyolefin material.

31. The brake hose assembly of claim 17 wherein the coating is formed of a material selected from the group consisting of polyvinyl chloride (PVC), polyethylene, expanded polytetrafluoroethylene (PTFE) and polyurethane.

32. The brake hose assembly of claim 17, wherein the coating is formed of a shrink-fit polyolefin material.

33. A durable, reusable hydraulic brake hose assembly for installation on the exterior of a bicycle frame comprising:

a flexible tube for carrying fluid;

a flexible fiber mesh layer covering the tube, thereby forming a reinforced hose;

a first fitting at a first end of the reinforced hose;

a second fitting at a second end of the reinforced hose; and a coating over the reinforced hose from the first end to the second end, covering a first point where the first fitting meets the reinforced hose and covering a second point where the second fitting meets the reinforced hose wherein the first and second fittings are configured and adapted to facilitate removal of the brake hose assembly from a bicycle brake system and re-attachment of the brake hose assembly to the bicycle brake system and the fiber mesh layer and coating protect the tube from structural damage and contamination caused by the natural elements during bicycling.

34. The brake hose assembly of claim 33 wherein the flexible tube is formed of a material selected from the group consisting of expanded polytetrafluoroethylene (PTFE), polypropylene, polyvinyl chloride (PVC), polyethylene and rubber.

35. The brake hose assembly of claim 33, wherein the flexible tube is formed of expanded polytetrafluoroethylene (PTFE).

36. The brake hose assembly of claim 33, wherein the fiber mesh layer is formed of a metallic material.

37. The brake hose assembly of claim 36, wherein the metallic material is selected from the group consisting of steel, stainless steel, aluminum, and titanium.

38. The brake hose assembly of claim 36, wherein the metallic material is stainless steel.

39. The brake hose assembly of claim 33 wherein the fiber mesh layer is formed of a material selected from the group consisting of carbon fiber, polyamide fiber, glass fiber, and graphite fiber.

40. The brake hose assembly of claim 33, wherein the first and second fittings are configured and adapted for removal from the reinforced hose and replacement on the reinforced hose.

41. The brake hose assembly of claim 40 wherein the first fitting comprises:

a cap threaded to accept a screw-type adaptor;

an olive; and an adaptor for a master cylinder wherein the first end of the reinforced hose is threaded through the cap, the olive is positioned over the first end of the reinforced hose, thereby preventing removal of the cap from the hose without removal of the olive, and the adaptor comprises threads for connection to the cap and interfaces with the olive to form a fluid-tight connection between the hose and the master cylinder.

42. The brake hose assembly of claim 40 wherein the second fitting comprises:

a cap threaded to accept a screw-type adaptor;

an olive; and an adaptor for a brake caliper wherein the second end of the reinforced hose is threaded through the cap, the olive is positioned over the second end of the reinforced hose, thereby preventing removal of the cap from the hose without removal of the olive, and the adaptor comprises threads for connection to the cap and interfaces with the olive to form a fluid-tight connection between the hose and the brake caliper.

43. The brake hose assembly of claim 33, wherein the coating is formed of a polyolefin material.

44. The brake hose assembly of claim 33, wherein the coating is formed of a material selected from the group consisting of polyvinyl chloride (PVC), polyethylene, expanded polytetrafluoroethylene (PTFE) and polyurethane.

45. The brake hose assembly of claim 33, wherein the coating is formed of a shrink-fit polyolefin material.

* * * * *